(12) United States Patent
Duan et al.

(10) Patent No.: US 10,915,909 B2
(45) Date of Patent: Feb. 9, 2021

(54) TERMINAL VERIFICATION METHOD, TERMINAL DEVICE, AND COMPUTER READABLE STORAGE MEDIUM

(71) Applicant: ZHUHAI JUNTIAN ELECTRONIC TECHNOLOGY CO., LTD., Guangdong (CN)

(72) Inventors: Zhengyang Duan, Beijing (CN); Honglei Chu, Beijing (CN); Liming Zhang, Beijing (CN); Chengzhi Jiang, Beijing (CN)

(73) Assignee: ZHUHAI JUNTIAN ELECTRONIC TECHNOLOGY CO., LTD., Guangdong (CN)

( * ) Notice: Subject to any disclaimer, the term of this patent is extended or adjusted under 35 U.S.C. 154(b) by 353 days.

(21) Appl. No.: 16/001,245

(22) Filed: Jun. 6, 2018

(65) Prior Publication Data
US 2019/0205896 A1    Jul. 4, 2019

(30) Foreign Application Priority Data
Dec. 29, 2017   (CN) .......................... 2017 1 1489743

(51) Int. Cl.
G06Q 30/00      (2012.01)
G06F 9/445      (2018.01)
G06F 21/57      (2013.01)

(52) U.S. Cl.
CPC ..... *G06Q 30/0185* (2013.01); *G06F 9/44505* (2013.01); *G06F 21/57* (2013.01)

(58) Field of Classification Search
CPC ................. G06F 21/44; G06F 11/0703; G06F 2221/2129; G06F 11/2247; G06F 21/57; G06F 9/44505; H04L 63/0876; H04L 63/12; G06Q 30/0185
See application file for complete search history.

(56) References Cited

U.S. PATENT DOCUMENTS

| 2015/0106282 | A1* | 4/2015 | Lee ...................... G06Q 30/018 705/318 |
| 2019/0026469 | A1* | 1/2019 | Cremin .................. G06F 21/57 |
| 2019/0205522 | A1* | 7/2019 | Duan ...................... G06F 21/44 |
| 2019/0205572 | A1* | 7/2019 | Duan ...................... G06F 21/44 |
| 2019/0205896 | A1* | 7/2019 | Duan ...................... G06F 21/57 |

* cited by examiner

*Primary Examiner* — Matthew Smithers
*Assistant Examiner* — Mirza Israr Javed
(74) *Attorney, Agent, or Firm* — Osha Bergman Watanabe & Burton LLP

(57) ABSTRACT

Embodiments of the present disclosure provide a terminal verification method, a terminal device and a computer readable storage medium. The method includes: reading machine verification parameters of a target terminal, determining that the target terminal is a fake in response to determining that the machine verification parameters of the target terminal satisfy a first condition, a second condition and a third condition, and displaying on a user interface of the target terminal that the target terminal is a fake.

15 Claims, 5 Drawing Sheets

TERMINAL VERIFICATION METHOD, TERMINAL DEVICE, AND COMPUTER READABLE STORAGE MEDIUM

CROSS-REFERENCE TO RELATED APPLICATIONS

This application is based on and claims a priority to Chinese Patent Application No. 201711489743.X, filed on Dec. 29, 2017, the entire contents of which are incorporated herein by reference.

FIELD

The present disclosure relates to the field of computer technology, and more particularly, to a terminal verification method, a terminal device and a computer readable storage medium.

BACKGROUND

With continuous development of science and technology, terminals such as mobile phones are constantly enriching public's life. Since it is convenient and quick to use the terminal to process information, terminals have become an indispensable part of people's work and life. However, with popularity of terminals, imitation industries for the terminals are also quietly rising. As fakes, various fake terminals imitate styles and functions of certified terminals, making it difficult for consumers to distinguish differences between the fake terminals and the certified terminals, and increasing risks of consumers being cheated. Therefore, detection for authenticity of terminals has gradually been valued by people.

In the related art, in the process of detecting the terminal, it is required to obtain various configuration parameters of the terminal, and compare respective configuration parameters with official configuration parameters of the certified terminal, so as to determine the authenticity of the terminal. However, when internal chip information of the terminal is modified, thus the acquired configuration parameters of the terminal may be unreal and unreliable, misdetection may occur, reliability of comparison results is reduced, and accuracy of the terminal detection is reduced.

SUMMARY

Embodiments of the present disclosure provide a terminal verification method, a terminal device and a computer readable storage medium.

According to a first aspect, there is provided a terminal verification method. The method includes: reading machine verification parameters of a target terminal, the machine verification parameters including N terminal configuration parameters; determining that the target terminal is a fake in response to determining that the machine verification parameters of the target terminal satisfy a first condition, a second condition and a third condition, in which the first condition includes determining a model of the target terminal according to respective terminal configuration parameters in a first parameter group of the target terminal, the first parameter group includes N1 terminal configuration parameters in the N terminal configuration parameters, the second condition includes finding objective A-type fake machine configuration parameters corresponding to the model from a first fake machine configuration parameter library according to the model of the target terminal, the first fake machine configu-
ration parameter library includes at least one group of A-type fake machine configuration parameters corresponding to at least one model, each group of A-type fake machine configuration parameters includes N2 terminal configuration parameters determined by machine verification parameters of a fake terminal, the third condition includes N2 terminal configuration parameters in the objective A-type fake machine configuration parameters being consistent with N2 terminal configuration parameters in a second parameter group of the target terminal, the second parameter group includes N2 terminal configuration parameters in the N terminal configuration parameters; and displaying on a user interface of the target terminal that the target terminal is a fake.

According to a second aspect, there is provided a terminal device. The terminal device includes: a machine verification parameter acquiring unit, a verifying unit and a display unit.

The machine verification parameter acquiring unit is configured to acquire machine verification parameters of a target terminal. The machine verification parameters of the target terminal include N terminal configuration parameters.

The verifying unit is configured to determine that the target terminal is a fake in response to determining that the machine verification parameters of the target terminal satisfy a first condition, a second condition and a third condition. The first condition includes determining a model of the target terminal according to respective terminal configuration parameters in a first parameter group of the target terminal. The first parameter group includes N1 terminal configuration parameters in the N terminal configuration parameters. The second condition includes finding objective A-type fake machine configuration parameters corresponding to the model from a first fake machine configuration parameter library according to the model of the target terminal. The first fake machine configuration parameter library includes at least one group of A-type fake machine configuration parameters corresponding to at least one model, and each group of A-type fake machine configuration parameters includes N2 terminal configuration parameters determined by machine verification parameters of a fake terminal. The third condition includes N2 terminal configuration parameters in the objective A-type fake machine configuration parameters being consistent with N2 terminal configuration parameters in a second parameter group of the target terminal. The second parameter group includes N2 terminal configuration parameters in the N terminal configuration parameters.

The display unit is configured to display on a user interface of the target terminal that, the target terminal is a fake.

According to a third aspect, there is provided a terminal device. The terminal device includes a processor, an input device, an output device and a memory. The processor, the input device, the output device and the memory are coupled to each other. The memory is configured to store a computer program including program instructions. The processor is configured to invoke the program instructions to perform the terminal verification method described in the first aspect.

According to a fourth aspect, there is provided a computer readable storage medium. The computer readable storage medium is configured to store computer programs. The computer programs include program instructions. When the program instructions are executed by a processor, the processor is caused to perform the terminal verification method described in the first aspect.

According to a fifth aspect, there is provided a computer program. The computer program includes program instructions. When the program instructions are executed by a processor, the processor is caused to perform the terminal verification method described in the first aspect.

BRIEF DESCRIPTION OF THE DRAWINGS

In order to clearly illustrate technical solutions of embodiments of the present disclosure, a brief description of drawings used in embodiments is given below. Obviously, the drawings in the following descriptions are only part embodiments of the present disclosure, and for those skilled in the art, other drawings can be obtained according to these drawings without creative labor.

DETAILED DESCRIPTION

Reference will be made clearly and completely technical solutions in embodiments of the present disclosure with accompanying drawings. Obviously, the embodiments described here are only part of the embodiments of the present disclosure and are not all embodiments of the present disclosure. Based on the embodiments of the present disclosure, other embodiments obtained by those skilled in the art without creative labor are within scope of the present disclosure.

Figure 1:
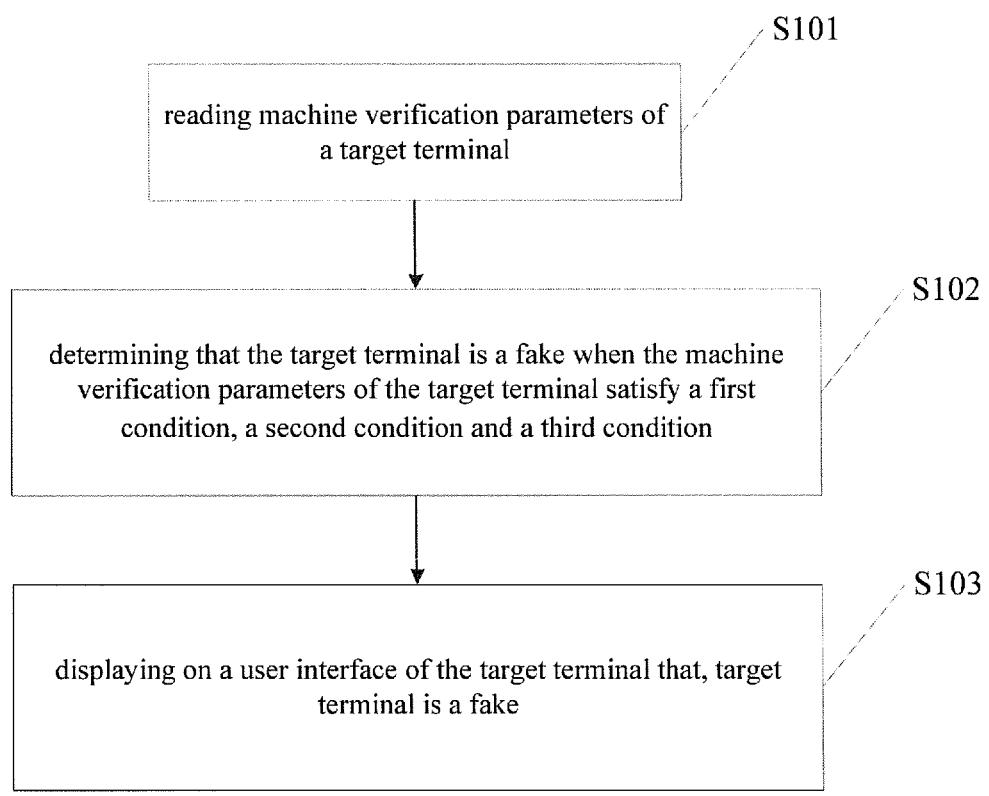
FIG. 1 is a flow chart of a first embodiment of a terminal verification method according to an embodiment of the present disclosure.

Referring to FIG. 1, which is a flow chart of a first embodiment of a terminal verification method according to an embodiment of the present disclosure. In this embodiment, a terminal device is described as an execution subject. The terminal device may include a device having a display device such as a mobile phone, a laptop computer, a tablet computer, or the like, which is not limited herein. As illustrated in FIG. 1, the terminal verification method may include followings.

At block S101, machine verification parameters of a target terminal are read.

In some possible implementations, the machine verification parameters of the target terminal read by the terminal device may include N terminal configuration parameters such as a brand parameter, a model number parameter, a device number parameter, a capacity parameter, a system platform, a graphics processing unit (GPU) manufacturer parameter, a GPU renderer parameter, etc., which are not limited herein. After the terminal device obtains an instruction inputted by a user for starting verification of the target terminal, in at least one embodiment, the terminal device can read the machine verification parameters of the target terminal through device performance detection. The target terminal may be the terminal device, and may also be a device connected with the terminal device other than the terminal device. For example, the terminal device can read preset identification information of a memory in a system of the target terminal, obtain a capacity parameter of the memory of the target terminal from the identification information, and take it as a parameter value of the capacity parameter of the target terminal. In at least one embodiment, the terminal device can also directly obtain preset machine verification parameters of the target terminal without through the device performance detection. Parameter values of the machine verification parameters of the target terminal may be performance parameter values or ratio values obtained by converting the performance parameter values based on a preset conversion rule, which are not limited herein. It should be noted that, when the terminal device cannot obtain some configuration information of the target terminal, for example, the read configuration information is abnormal read, NULL, or Unknown, it may be determined that the terminal configuration parameters corresponding to the configuration information in the machine verification parameters of the target terminal are abnormally read. Otherwise, it may be determined that the terminal configuration parameters corresponding to the configuration information in the machine verification parameters of the target terminal are normally read.

At block S102, it is determined that the target terminal is a fake when the machine verification parameters of the target terminal satisfy a first condition, a second condition and a third condition.

In some possible implementations, after the terminal device reads the machine verification parameters, the terminal device may determine whether the machine verification parameters of the target terminal satisfy the first condition, the second condition and the third condition. The machine verification parameters include N terminal configuration parameters. The first condition includes the terminal device determining a model of the target terminal according to respective terminal configuration parameters in a first parameter group of the target terminal. The first parameter group includes N1 terminal configuration parameters in the N terminal configuration parameters. For example, the first parameter group may include a brand parameter, a model number parameter, a device number parameter and a capacity parameter in the machine verification parameters. The second condition includes the terminal device finding objective A-type fake machine configuration parameters corresponding to the model from a first fake machine configuration parameter library according to the model of the target terminal. The first fake machine configuration parameter library includes at least one group of A-type fake machine configuration parameters corresponding to at least one model, and each group of A-type fake machine configuration parameters includes N2 terminal configuration parameters determined by machine verification parameters of the fake terminal. For example, the A-type fake machine configuration parameters may include a capacity parameter, an operating platform parameter, a mainboard number parameter, a core number parameter, a CPU architecture parameter, a GPU manufacture parameter and a GPU renderer parameter. The third condition includes the terminal device determining N2 terminal configuration parameters in the objective A-type fake machine configuration parameters being consistent with N2 terminal configuration parameters in a second parameter group of the target terminal. The second parameter group includes N2 terminal configuration parameters in the N terminal configuration parameters, and parameter names of respective terminal configuration parameters in the second parameter group are consistent with parameter names of respective terminal configuration parameters in the A-type fake machine configuration parameters. When the machine verification parameters of the target terminal satisfy the first condition, the second condition and the third condition, it may be determined that the target terminal is a fake. For example, assuming that the brand parameter is Samsung, the model number parameter is SM-G995F, the device number parameter is XXXX and the capacity parameter is 64 GB in the first parameter group. The terminal device can determine that the model of the target terminal is SM-G995F according to the brand parameter and the model number parameter. In this case, it is indicated that the machine verification parameters of the target terminal satisfy the first condition. When the terminal device determines that the model of the target terminal is SM-G995F, the terminal device can obtain A-type fake machine configuration parameters corresponding to SM-G995F from a preset first fake machine configuration parameter library. In this case, it is indicated that the machine verification parameters of the target terminal satisfy the second condition. When the terminal device determines that the A-type fake machine configuration parameters are consistent with the second parameter group of the target terminal, it is indicated that the machine verification parameters of the target terminal satisfy the third condition, the terminal device can determine that the target terminal is a fake.

In some possible implementations, before the terminal device determines whether the machine verification parameters of the target terminal satisfy the first condition, the second condition and the third condition, the terminal device can determine whether the machine verification parameters of the target terminal satisfy the fourth condition, the fifth condition and the sixth condition. The fourth condition includes the terminal device determining the model of the target terminal according to respective terminal configuration parameters in a third parameter group of the target terminal. The third parameter group includes N3 terminal configuration parameters in the N terminal configuration parameters. For example, the third parameter group may include a brand parameter, a model number parameter, a device number parameter, a capacity parameter, an operating platform parameter and a CPU hardware information parameter. The fifth condition includes the terminal device finding objective system modification parameters corresponding to the model from a preset system modification parameter library according to the model of the target terminal. The system modification parameter library includes at least one group of system modification parameters corresponding to at least one model, and each group of system modification parameters includes N3 terminal configuration parameters determined by machine verification parameters of a terminal whose system is modified. For example, the system modification parameters may include a mainboard parameter, a core number parameter, a CPU architecture parameter, a GPU manufacture parameter, a GPU renderer parameter, a first screen resolution parameter and a second screen resolution parameter of a terminal whose system is modified. The sixth condition includes N3 terminal configuration parameters in the objective system modification parameters being consistent with N3 terminal configuration parameters in a fourth parameter group of the target terminal. The fourth parameter group includes N3 terminal configuration parameters in the N terminal configuration parameters. In particular, parameter names of the N3 terminal configuration parameters in the fourth parameter group are consistent with parameter names of the N3 terminal configuration parameters in the system modification parameters. When the terminal device determines that the machine verification parameters of the target terminal satisfy the fourth condition, the fifth condition and the sixth condition, it may be determined that the system of the target terminal is modified. For example, assuming that the brand parameter is Samsung, the model number parameter is Galaxy S8, the device number parameter is XXXX, the capacity parameter is 64 GB, the operating platform parameter is LLLL and the CPU hardware information parameter is IIII in the third parameter group. The terminal device may first determine that an approximate model of the target terminal is Galaxy S8 according to the brand parameter and the model number parameter. Then, the terminal device may determine that the model of the target terminal is Galaxy S8 (SM-G9) according to the device number parameter and the capacity parameter. In this case, it is indicated that the machine verification parameters of the target terminal satisfy the fourth condition. When the terminal device determines that the model of the target terminal is Galaxy S8 (SM-G9), the terminal device can obtain objective system modification parameters corresponding to Galaxy S8 (SM-G9) from a preset system modification parameter library. In this case, it is indicated that the machine verification parameters of the target terminal satisfy the fifth condition. When the terminal device determines that the objective system modification parameters are consistent with the fourth parameter group, it is indicated that the machine verification parameters of the target terminal satisfy the sixth condition. The terminal device can determine that the system of the target terminal is modified. When the terminal device determines that the machine verification parameters of the target terminal do not satisfy the fourth condition, the fifth condition and the sixth condition, it may be determined that the target terminal is a fake in response to determining that the machine verification parameters of the target terminal satisfy the first condition, the second condition and the third condition.

In some possible implementations, the first parameter group of the target terminal may include a brand parameter, a device number parameter, a capacity and a model number parameter. Before the terminal device determines whether the machine verification parameters of the target terminal satisfy the fourth condition, the fifth condition and the sixth condition, the terminal device can also determine whether the machine verification parameters of the target terminal satisfy the first condition and a seventh condition. The first condition includes determining the model of the target terminal according to respective terminal configuration parameters in the first parameter group of the target terminal. The first parameter group includes N1 terminal configuration parameters in the N terminal configuration parameters. The seventh condition includes the terminal device finding a group of A-type certified configuration parameters corresponding to the model from a preset first certified configuration parameter library according to the model of the target terminal (for convenience of description, the group of A-type certified configuration parameters will be taken as objective A-type certified configuration parameters for explanation). The first certified configuration parameter library includes at least one group of A-type certified configuration parameters corresponding to at least one model, and each group of A-type certified configuration parameters includes N4 terminal configuration parameters determined by machine verification parameters of a certified terminal. For example, a group of A-type certified configuration parameters may include an operating platform parameter, a CPU hardware parameter, a mainboard parameter, a screen density parameter, a CPU ID parameter, a GPU manufacture parameter, a GPU renderer parameter, a core number parameter, a CPU architecture parameter, a first screen resolution parameter and a second screen resolution parameter of a terminal of model Galaxy S8 (SM-G9). When the terminal device determines that the machine verification parameters of the target terminal satisfy the first condition and the seventh condition, the terminal device may determine whether the machine verification parameters of the target terminal satisfy the eighth condition. The eighth condition includes a parameter value similarity between N4 parameter values of N4 terminal configuration parameters in the N terminal configuration parameters of the target terminal and N4 parameter values of the objective A-type certified configuration parameters being greater than or equal to a preset similarity threshold. When it is determined that the machine verification parameters of the target terminal satisfy the eighth condition, it is determined that the target terminal is a certified product, otherwise it is determined that the target terminal is a fake. In detail, each objective configuration parameter in the N4 terminal configuration parameters (for convenience of description, the following will take the objective configuration parameters for explanation) included in the objective A-type certified configuration parameters may correspond to a weight value. For example, a certified terminal of model SM-G995F corresponds to a group of objective A-type certified configuration parameters in the first certified configuration parameter library. The objective A-type certified configuration parameters include N4 configuration parameters of the certified terminal, such as a model number parameter, an operating platform parameter, a CPU hardware parameter, a screen parameter, etc. The N4 configuration parameters of the certified terminal are the objective configuration parameters. The following takes an objective configuration parameter A in the N4 objective configuration parameters as an example. Assuming that the weight of A is a, the terminal device may detect whether the parameter value of the terminal configuration parameter corresponding to the objective configuration parameter A in the machine verification parameters of the target terminal is consistent with the parameter value of the objective configuration parameter A. When the determination is yes, it is determined that an objective similarity of the objective configuration parameter A is a. When the determination is no, it is determined that the objective similarity of the objective configuration parameter A is 0. Similarly, the terminal device can obtain the sum of objective similarities of respective objective configuration parameters in the objective A-type certified configuration parameters, i.e., the parameter value similarity. Then, the terminal device may detect whether the parameter value similarity is greater than or equal to a preset similarity threshold. When the parameter value similarity is greater than or equal to the preset similarity threshold, it is determined that the target terminal is a certified product, otherwise it is determined that the target terminal is a fake. When the machine verification parameters of the target terminal do not satisfy both the first condition and the seventh condition, it is determined that the system of the target terminal is modified in response to determining that the machine verification parameters of the target terminal satisfy the fourth condition, the fifth condition and the sixth condition In some possible implementations, before the terminal device determines whether the machine verification parameters of the target terminal satisfy the first condition and the seventh condition, the terminal device may also direct determine whether the machine verification parameters of the target terminal satisfy the ninth condition and the tenth condition, so as to determine whether the target terminal is incompletely configured. The ninth condition includes abnormally reading a parameter value of a GPU manufacturer parameter and a parameter value of a GPU renderer parameter. The ninth condition includes normally reading parameter values of respective terminal configuration parameters in the (N−2) terminal configuration parameters of the machine verification parameters of the target terminal. The (N−2) terminal configuration parameters may include a brand parameter, a device number parameter, a mainboard number parameter, a capacity parameter, a model number parameter, an operating platform parameter, a CPU hardware parameter, a screen parameter, a CPU ID, etc. In detail, the terminal device may detect whether the parameter value of the GPU manufacture parameter and the parameter value of the GPU renderer parameter in the machine verification parameters of the target terminal are abnormally read. When the terminal device determines that the parameter value of the GPU manufacture parameter and the parameter value of the GPU renderer parameter of the target terminal are abnormally read, it is indicated that the machine verification parameters of the target terminal satisfy the ninth condition. The terminal device may continue to determine whether parameter values of respective terminal configuration parameters in the (N−2) terminal configuration parameters of the machine verification parameters of the target terminal are abnormally read. When the terminal device determines that the parameter values of respective terminal configuration parameters in the (N−2) terminal configuration parameters of the target terminal are normally read, it is indicated that the machine verification parameters of the target terminal satisfy the tenth condition, the terminal device can determine that the target terminal is incompletely configured. When the terminal device detects that the machine verification parameters of the target terminal do not satisfy both the ninth condition and the tenth condition, the terminal device may determine whether the machine verification parameters of the target terminal satisfy the first condition and the seventh condition.

In some possible implementations, before the terminal device determines whether the machine verification parameters of the target terminal satisfy the ninth condition and the tenth condition, the terminal device may detect whether a brand parameter of the target terminal is in a preset fake machine brand parameter library. When the brand parameter is in the preset fake machine brand parameter library, it may be determined that the target terminal is a fake. For example, assuming that the terminal device detects that the machine verification parameters of the target terminal include a brand parameter 0PP0 (zero PP zero), and then the terminal device also detects the brand parameter 0PP0 in the preset fake machine brand parameter library, the terminal device may determine that the target terminal is a fake. When the terminal device determines that the brand parameter of the target terminal is not in the preset fake machine brand parameter library, the terminal device may determine whether the machine verification parameters of the target terminal satisfy the ninth condition and the tenth condition.

At block S103, a verification result of the target terminal is displayed on a user interface of the target terminal.

Figure 2:
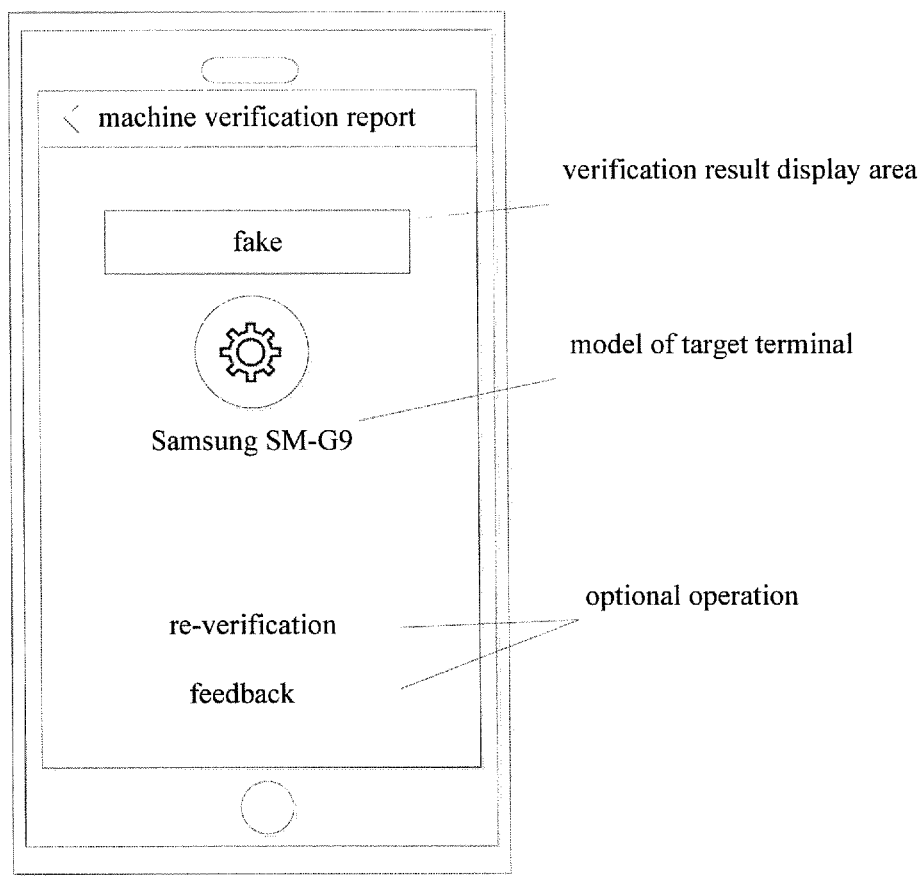
FIG. 2 is a schematic diagram of a first display effect of a verification result according to an embodiment of the present disclosure.
Figure 3:
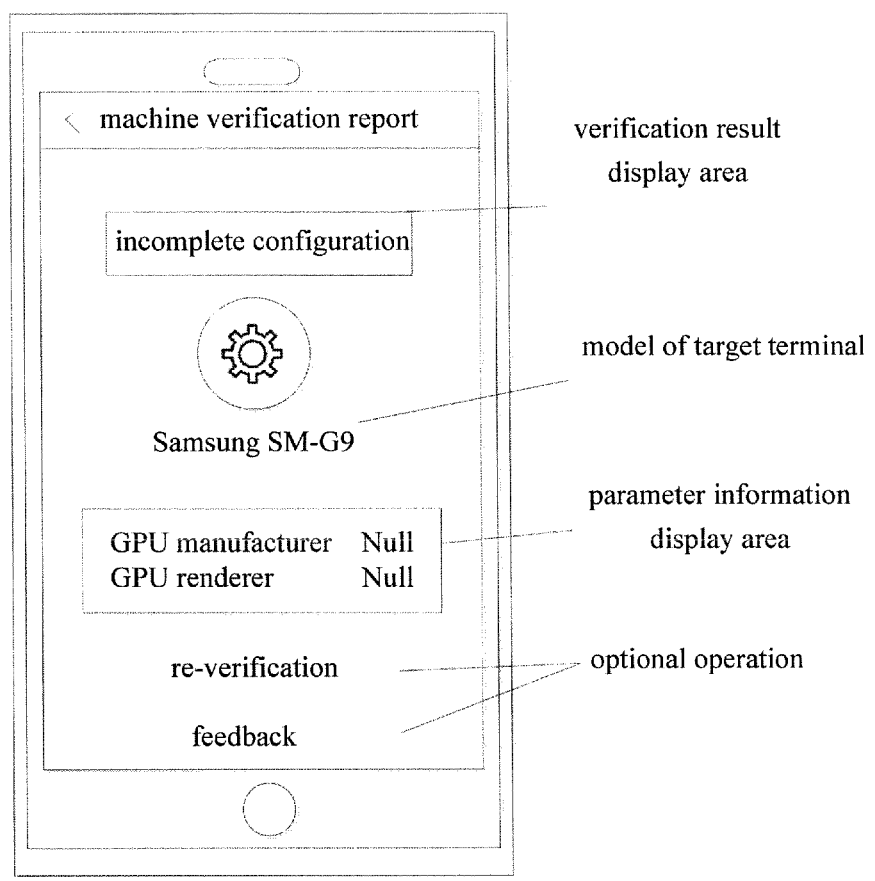
FIG. 3 is a schematic diagram of a second display effect of a verification result according to an embodiment of the present disclosure.

In some possible implementations, after the terminal device obtains the verification result of the target terminal, the terminal device can output the verification result. In detail, the terminal device can display the verification result of the target terminal on its user interface. For example, please refer to FIG. 2, which is a schematic diagram of a first display effect of a verification result according to an embodiment of the present disclosure. When the terminal device determines that the machine verification parameters of the target terminal satisfy the first condition, the second condition and the third condition, it is determined that the target terminal is a fake. The terminal device may prompt on its user interface that the target terminal is a fake. Moreover, the terminal device may also provide some options (such as re-verification or feedback) on its user interface for user selection. In at least one embodiment, after the terminal device obtains the verification result of the target terminal, the terminal device can broadcast the verification result of the target terminal through a voice broadcast function, without requiring the user to check the verification result through the user interface of the terminal device, user experience of the terminal device is improved. Moreover, please refer to FIG. 3, which is a schematic diagram of a second display effect of a verification result according to an embodiment of the present disclosure. When the target terminal is incompletely configured, the terminal device may prompt on its user interface that the target terminal is incompletely configured, and display missing parameters in the parameter information display area. Moreover, the terminal device may also provide some options (such as re-verification or feedback) on its user interface for user selection.

In embodiments of the present disclosure, the terminal device detects the machine verification parameters of the target terminal. The machine verification parameters include N terminal configuration parameters. When the machine verification parameters of the target terminal satisfy the first condition, the second condition and the third condition, it is determined that the target terminal is a fake. The first condition includes determining the model of the target terminal according to respective terminal configuration parameters in the first parameter group of the target terminal. The first parameter group includes N1 terminal configuration parameters in the N terminal configuration parameters. The second condition includes finding objective A-type fake machine configuration parameters corresponding to the model from a first fake machine configuration parameter library according to the model of the target terminal. The first fake machine configuration parameter library includes at least one group of A-type fake machine configuration parameters corresponding to at least one model, and each group of A-type fake machine configuration parameters includes N2 terminal configuration parameters determined by machine verification parameters of a fake terminal. The third condition includes N2 terminal configuration parameters in the objective A-type fake machine configuration parameters being consistent with N2 terminal configuration parameters in a second parameter group of the target terminal. The second parameter group includes N2 terminal configuration parameters in the N terminal configuration parameters. It is displayed on the user interface of the target terminal that the target terminal is a fake. In the present disclosure, it can be determined that the target terminal is a fake by detecting that the N2 terminal configuration parameters in the machine verification parameters are consistent with the objective A-type fake machine configuration parameters in the preset first fake machine configuration parameter library, the probability of misdetection due to modification of internal chip information of the terminal can be reduced, and accuracy of the terminal detection can be improved.

Figure 4:
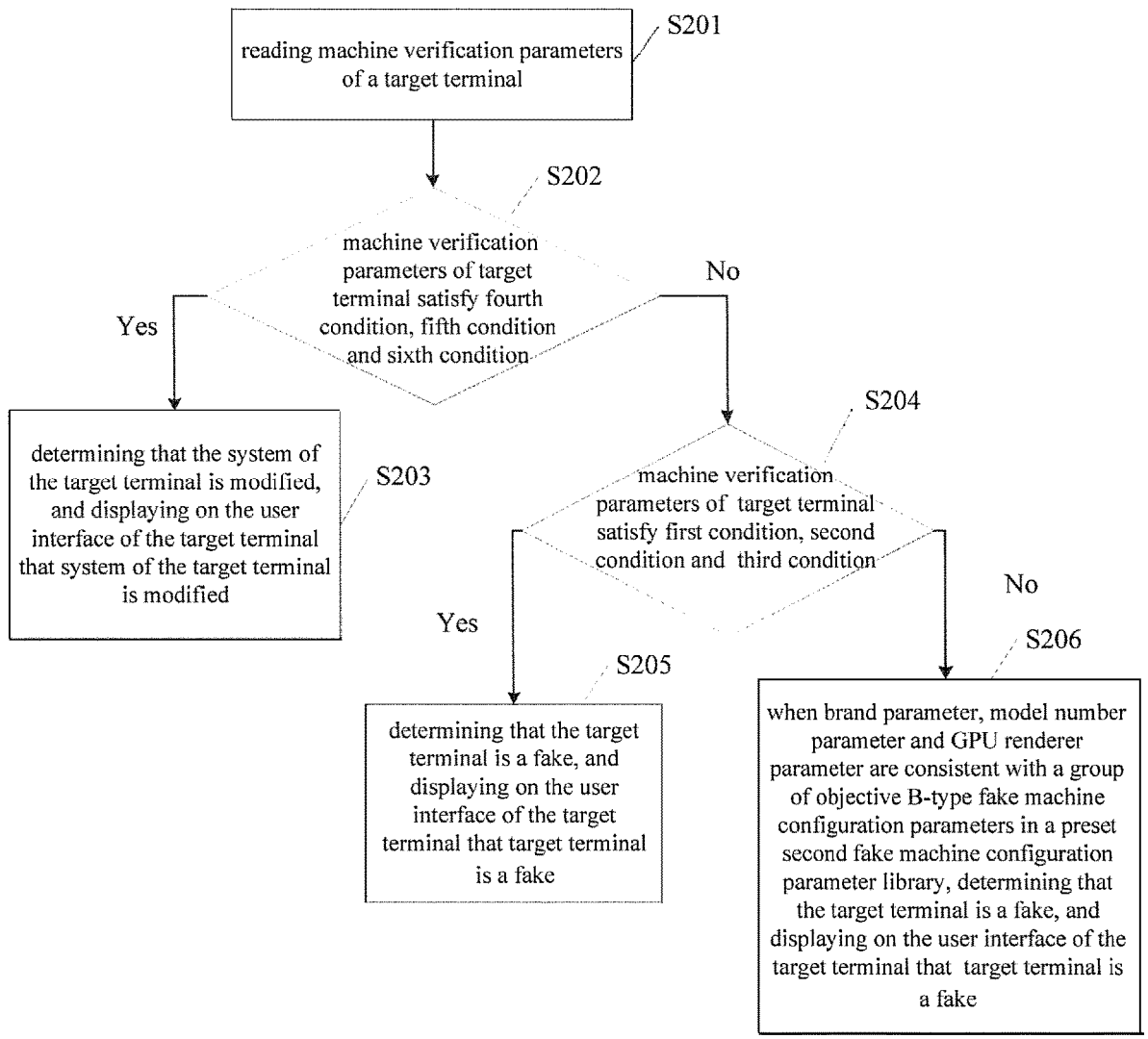
FIG. 4 is a flow chart of a second embodiment of a terminal verification method according to an embodiment of the present disclosure.

Referring to FIG. 4, which is a flow chart of a second embodiment of a terminal verification method according to an embodiment of the present disclosure. In this embodiment, a terminal device is described as an execution subject. The terminal device may include a device provided with a display device such as a mobile phone, a laptop computer, a tablet computer, or the like, which is not limited herein. As illustrated in FIG. 4, the terminal verification method may include followings.

At block S201, machine verification parameters of a target terminal are read.

In some possible implementations, for the process of the terminal device reading the machine verification parameters of the target terminal, reference may be made to the process of reading the machine verification parameters of the target terminal described in block S101 in the first embodiment, and details are not described herein again.

At block S202, it is determined whether the machine verification parameters of the target terminal satisfy a fourth condition, a fifth condition and a sixth condition.

In some possible implementations, when it is determined that the machine verification parameters of the target terminal satisfy the fourth condition, the fifth condition and the sixth condition, block S203 is performed. When it is determined that the machine verification parameters of the target terminal do not satisfy the fourth condition, the fifth condition and the sixth condition, block S204 is performed. In detail, the machine verification parameters of the target terminal may include a brand parameter, a model number parameter, a device number parameter, a capacity parameter, a system platform parameter, a GPU manufacture parameter, a GPU renderer parameter, etc., which are not limited herein. After the machine verification parameters of the target terminal are read, the terminal device can determine whether the machine verification parameters of the target terminal satisfy the fourth condition, the fifth condition and the sixth condition. The fourth condition includes the terminal device determining the model of the target terminal according to respective terminal configuration parameters in a third parameter group of the target terminal. The third parameter group includes N3 terminal configuration parameters in the N terminal configuration parameters. For example, the third parameter group may include a brand parameter, a model number parameter, a device number parameter, a capacity parameter, a system platform parameter and a CPU hardware information parameter. The fifth condition includes the terminal device finding objective system modification parameters corresponding to the model from a preset system modification parameter library according to the model of the target terminal. The system modification parameter library includes at least one group of system modification parameters corresponding to at least one model, and each group of system modification parameters includes N3 terminal configuration parameters determined by machine verification parameters of a terminal whose system is modified. For example, the system modification parameters may include a mainboard parameter, a core number parameter, a CPU architecture parameter, a GPU manufacture parameter, a GPU renderer parameter and a screen resolution parameter of a terminal whose system is modified. The sixth condition includes N3 terminal configuration parameters in the objective system modification parameters being consistent with N3 terminal configuration parameters in a fourth parameter group of the target terminal. The fourth parameter group includes N3 terminal configuration parameters in the N terminal configuration parameters. When the determination is yes, block S203 is performed. When the determination is no, block S204 is performed.

In some possible implementations, the first parameter group of the target terminal may include a brand parameter, a device number parameter, a capacity parameter and a model number parameter. Before the terminal device determines whether the machine verification parameters of the target terminal satisfy the fourth condition, the fifth and the sixth condition, the terminal device can also determine the verification result of the target terminal according to the first condition, the seventh condition and the eighth condition. For the process of the terminal device determining the verification result of the target terminal according to the first condition, the seventh condition and the eighth condition, reference may be made to the process of determining the verification result of the target terminal according to the first condition, the seventh condition and the eighth condition described in block S102, and details are not described herein again. After the terminal device determines the verification result of the target terminal, the terminal device can display the verification result of the target terminal on its user interface. For details, reference may be made to the process of the terminal device displaying the verification result of the target terminal on its user interface described in block S103, and details are not described herein again.

In some possible implementations, before the terminal device determines whether the machine verification parameters of the target terminal satisfy the first condition, the seventh condition and the eighth condition, the terminal device can also determine the verification result of the target terminal according to the ninth condition and the tenth condition. For the process of the terminal device determining the verification result of the target terminal according to the ninth condition and the tenth condition, reference may be made to the process of determining the verification result of the target terminal according to the ninth condition and the tenth condition described in block S102, and details are not described herein again. After the terminal device determines the verification result of the target terminal, the terminal device can display the verification result of the target terminal on its user interface. For details, reference may be made to the process of the terminal device displaying the verification result of the target terminal on its user interface described in block S103, and details are not described herein again.

In some possible implementations, before the terminal device determines whether the machine verification parameters of the target terminal satisfy the ninth condition and the tenth condition, the terminal device may detect whether a brand parameter of the target terminal is in a preset fake machine brand parameter library. When the brand parameter is in the preset fake machine brand parameter library, it may be determined that the target terminal is a fake. For example, assuming that the terminal device detects that the machine verification parameters of the target terminal include a brand parameter 0PP0 (zero PP zero), and then the terminal device also detects the brand parameter 0PP0 in the preset fake machine brand parameter library, the terminal device may determine that the target terminal is a fake. When the terminal device determines that the brand parameter is not in the preset fake machine brand parameter library, the terminal device may determine whether the machine verification parameters of the target terminal satisfy the ninth condition and the tenth condition.

At block S203, it is determined that the system of the target terminal is modified, and it is displayed on the user interface of the target terminal that the system of the target terminal is modified.

In some possible implementations, when the terminal device determines that the machine verification parameters of the target terminal satisfy the fourth condition, the fifth condition and the sixth condition, it may be determined that the system of the target terminal is modified. After the terminal device determines that the system of the target terminal is modified, the terminal device may prompt on the user interface of the target terminal that the system of the target terminal is modified, and describe in detail which verification parameter is abnormally read. Moreover, the terminal device may also provide some options (such as re-verification or feedback) on the user interface of the target terminal for user selection. Please refer to FIG. 2 for specific effects. In this case, system modification is displayed on the verification result display area.

At block S204, it is determined whether the machine verification parameters of the target terminal satisfy the first condition, the second condition and the third condition.

In some possible implementations, when the terminal device determines that the machine verification parameters of the target terminal satisfy the first condition, the second condition and the third condition, block S205 is performed. When the terminal device determines that the machine verification parameters of the target terminal do not satisfy the first condition, the second condition and the third condition, block S206 is performed.

At block S205, it is determined that the target terminal is a fake, and it is displayed on the user interface of the target terminal that the target terminal is a fake.

In some possible implementations, after the terminal device reads the machine verification parameters, the terminal device may determine whether the machine verification parameters of the target terminal satisfy the first condition, the second condition and the third condition. The machine verification parameters include N terminal configuration parameters. The first condition includes the terminal device determining the model of the target terminal according to respective terminal configuration parameters in a first parameter group of the target terminal. The first parameter group includes N1 terminal configuration parameters in the N terminal configuration parameters. For example, the first parameter group may include a brand parameter, a model number parameter, a device number parameter and a capacity parameter in the machine verification parameters. The second condition includes the terminal device finding objective A-type fake machine configuration parameters corresponding to the model from a first fake machine configuration parameter library according to the model of the target terminal. The first fake machine configuration parameter library includes at least one group of A-type fake machine configuration parameters corresponding to at least one model, and each group of A-type fake machine configuration parameters includes N2 terminal configuration parameters determined by machine verification parameters of the fake terminal. For example, the A-type fake machine configuration parameters may include a capacity parameter, an operating platform parameter, a mainboard number parameter, a core number parameter, a CPU architecture parameter, a GPU manufacture parameter and a GPU renderer parameter. The third condition includes the terminal device determining N2 terminal configuration parameters in the objective A-type fake machine configuration parameters being consistent with N2 terminal configuration parameters in a second parameter group of the target terminal. The second parameter group of the target terminal includes N2 terminal configuration parameters in the N terminal configuration parameters, and parameter names of respective terminal configuration parameters in the second parameter group are consistent with parameter names of respective terminal configuration parameters in the A-type fake machine configuration parameters. When the machine verification parameters of the target terminal satisfy the first condition, the second condition and the third condition, it may be determined that the target terminal is a fake. For example, assuming that the brand parameter is Samsung, the model number parameter is SM-G995F, the device number parameter is XXXX and the capacity parameter is 64 GB in the first parameter group. The terminal device can determine that the model of the target terminal is SM-G995F according to the brand parameter and the model number parameter. In this case, it is indicated that the machine verification parameters of the target terminal satisfy the first condition. When the terminal device determines that the model of the target terminal is SM-G995F, the terminal device can obtain A-type fake machine configuration parameters corresponding to SM-G995F from a preset first fake machine configuration parameter library. In this case, it is indicated that the machine verification parameters of the target terminal satisfy the second condition. When the terminal device determines that the A-type fake machine configuration parameters are consistent with the second parameter group of the target terminal, it is indicated that the machine verification parameters of the target terminal satisfy the third condition, the terminal device can determine that the target terminal is a fake. After the terminal device determines the verification result of the target terminal, the terminal device can display the verification result of the target terminal on its user interface. For details, reference may be made to the process of displaying the verification result of the target terminal on the user interface of the target terminal described in block S103 in the first embodiment, and details are not described herein again.

At block S206, when the brand parameter, the model number parameter and the GPU renderer parameter are consistent with a group of objective B-type fake machine configuration parameters in a preset second fake machine configuration parameter library, it is determined that the target terminal is a fake, and it is displayed on the user interface of the target terminal that the target terminal is a fake.

In some possible implementations, when the terminal device determines that the machine verification parameters of the target terminal do not satisfy the first condition, the second condition and the third condition, the terminal device may detect the brand parameter, the model number parameter and the GPU renderer parameter in the machine verification parameters of the target terminal. The terminal device can detect whether any group of B-type fake machine configuration parameters in the preset second fake machine configuration parameter library is matched with the brand parameter, the model number parameter and the GPU renderer parameter. The second fake machine configuration parameter library includes one or more groups of B-type fake machine configuration parameters, and each group of B-type fake machine configuration parameters includes the brand parameter, the model number parameter and the GPU renderer parameter of the fake terminal. When the terminal device detects that a group of objective B-type fake machine configuration parameters in the second fake machine configuration parameter library is matched with the brand parameter, the model number parameter and the GPU parameter, it is determined that target terminal is a fake. Then, the terminal device can display the verification result of the target terminal on its user interface. Moreover, the terminal device may also provide some options (such as re-verification or feedback) on its user interface for user selection.

In some possible implementations, when the terminal device determines that any group of B-type fake machine configuration parameters in the second fake machine configuration parameter library is not matched with the brand parameter, the model number parameter and the GPU renderer parameter, the terminal device may detect whether a parameter value of the brand parameter, a parameter value of the model number parameter, a parameter value of the device number parameter and a parameter value of the capacity parameter in the first parameter group of the machine verification parameters of the target terminal are normally read. When the determination is no, it is determined that the target terminal is incompletely configured. Then, the terminal device can display on its user interface that the target terminal is incompletely configured. Moreover, the terminal device may also provide some options (such as re-verification or feedback) on its user interface for user selection.

In some possible implementations, when the parameter value of the brand parameter, the parameter value of the model number parameter, the parameter value of the device number parameter and the parameter value of the capacity parameter are normally read, the terminal device can determine the model of the target terminal according to the brand parameter, the model number parameter, the device number parameter and the capacity parameter, and obtain objective B-type certified configuration parameters from a second certified configuration parameter library according to the model of the target terminal. The second certified configuration parameter library includes at least one group of B-type certified configuration parameters corresponding to at least one model, and each group of B-type certified configuration parameters includes N4 terminal configuration parameters determined by machine verification parameters of a certified terminal. For the process of the terminal device obtaining B-type certified configuration parameters from the second certified configuration parameter library, reference may be made to the process of the terminal device obtaining the objective A-type certified configuration parameters from the first certified configuration parameter library described in block S102 in the first embodiment, and details are not described herein again. Then, the terminal device can determine the verification result of the target terminal according to the machine verification parameters of the target terminal and the objective B-type certified configuration parameters. For the process of the terminal device determining the verification result of the target terminal according to the machine verification parameters of the target terminal and the objective B-type certified configuration parameters, reference may be made to the process of the terminal device determining the verification result of the target terminal according to the machine verification parameters of the target terminal and the objective A-type certified configuration parameters described in block S102 in the first embodiment, and details are not described herein again. In at least one embodiment, the verification result of the target terminal determined by the terminal device according to the machine verification parameters of the target terminal and the objective B-type certified configuration parameters may at least include three types of a certified product, a fake, or being unidentified.

In embodiments of the present disclosure, the terminal device reads the machine verification parameters of the target terminal. The machine verification parameters include N terminal configuration parameters. When the machine verification parameters of the target terminal satisfy the first condition, the second condition and the third condition, it is determined that the target terminal is a fake. The first condition includes determining the model of the target terminal according to respective terminal configuration parameters in the first parameter group of the target terminal. The first parameter group includes N1 terminal configuration parameters in the N terminal configuration parameters. The second condition includes finding objective A-type fake machine configuration parameters corresponding to the model from a first fake machine configuration parameter library according to the model of the target terminal. The first fake machine configuration parameter library includes at least one group of A-type fake machine configuration parameters corresponding to at least one model, and each group of A-type fake machine configuration parameters includes N2 terminal configuration parameters determined by machine verification parameters of a fake terminal. The third condition includes N2 terminal configuration parameters in the objective A-type fake machine configuration parameters being consistent with N2 terminal configuration parameters in a second parameter group of the target terminal. The second parameter group includes N2 terminal configuration parameters in the N terminal configuration parameters. It is displayed on the user interface of the target terminal that the target terminal is a fake. Moreover, in embodiments of the present disclosure, the process of determining whether the target terminal is incompletely configured is also added, and verification means for the target terminal are enriched. By applying embodiments of the present disclosure, probability of misdetection due to modification of internal chip information of the terminal can be reduced, and accuracy of terminal detection can be improved.

Figure 5:
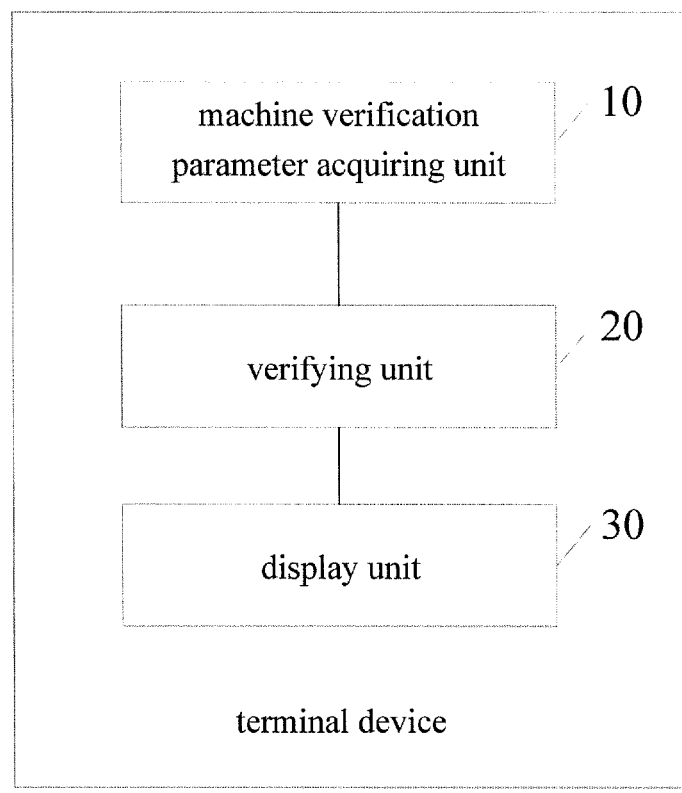
FIG. 5 is a block diagram of a terminal according to an embodiment of the present disclosure.

Referring to FIG. 5, which is a block diagram of a terminal device according to an embodiment of the present disclosure. The terminal device includes a machine verification parameter acquiring unit 10, a verifying unit 20 and a display unit 30.

The machine verification parameter acquiring unit 10 is configured to read machine verification parameters of a target terminal. The machine verification parameters of the target terminal include N terminal configuration parameters.

The verifying unit 20 is configured to determine that the target terminal is a fake in response to determining that the machine verification parameters of the target terminal satisfy a first condition, a second condition and a third condition. The first condition includes the verifying unit 20 determining a model of the target terminal according to respective terminal configuration parameters in a first parameter group of the target terminal. The first parameter group includes N1 terminal configuration parameters in the N terminal configuration parameters. The second condition includes the verifying unit 20 finding objective A-type fake machine configuration parameters corresponding to the model from a first fake machine configuration parameter library according to the model of the target terminal. The first fake machine configuration parameter library includes at least one group of A-type fake machine configuration parameters corresponding to at least one model, and each group of A-type fake machine configuration parameters includes N2 terminal configuration parameters determined by machine verification parameters of a fake terminal. The third condition includes the verifying unit 20 determining N2 terminal configuration parameters in the objective A-type fake machine configuration parameters being consistent with N2 terminal configuration parameters in a second parameter group of the target terminal. The second parameter group includes N2 terminal configuration parameters in the N terminal configuration parameters.

The display unit 30 is configured to display on a user interface of the target terminal that, the target terminal is a fake.

In some possible implementations, before the verifying unit 20 determines that the target terminal is a fake in response to determining that the machine verification parameters of the target terminal satisfy the first condition, the second condition and the third condition, the verifying unit 20 is configured to determine that a system of the target terminal is modified in response to determining that the machine verification parameters of the target terminal satisfy a fourth condition, a fifth condition and a sixth condition. The fourth condition includes determining the model of the target terminal according to respective terminal configuration parameters in a third parameter group of the target terminal. The third parameter group includes N3 terminal configuration parameters in the N terminal configuration parameters. The fifth condition includes finding objective system modification parameters corresponding to the model from a preset system modification parameter library according to the model of the target terminal. The system modification parameter library includes at least one group of system modification parameters corresponding to at least one model, and each group of system modification parameters includes N3 terminal configuration parameters determined by machine verification parameters of a terminal whose system is modified. The sixth condition includes N3 terminal configuration parameters in the objective system modification parameters being consistent with N3 terminal configuration parameters in a fourth parameter group of the target terminal. The fourth parameter group includes N3 terminal configuration parameters in the N terminal configuration parameters. When the verifying unit 20 determines that the machine verification parameters of the target terminal do not satisfy the fourth condition, the fifth condition and the sixth condition, the verifying unit 20 may continue to determine whether the machine verification parameters of the target terminal satisfy the first condition, the second condition and the third condition.

The display unit 30 is configured to display on a user interface of the target terminal that, the system of the target terminal is modified.

In some possible implementations, the first parameter group of the target terminal includes a brand parameter, a device number parameter, a capacity parameter and a model number parameter. Before the verifying unit 20 determines that the system of the target terminal is modified in response to determining that the machine verification parameters of the target terminal satisfy the fourth condition, the fifth condition and the sixth condition, the verifying unit 20 is further configured to determine whether the machine verification parameters of the target terminal satisfy an eighth condition in response to determining that the machine verification parameters of the target terminal satisfy the first condition and a seventh condition. The first condition includes determining the model of the target terminal according to respective terminal configuration parameters in the first parameter group of the target terminal. The seventh condition includes finding objective A-type certified configuration parameters corresponding to the model from a preset first certified configuration parameter library according to the model of the target terminal. The first certified configuration parameter library includes at least one group of A-type certified configuration parameters corresponding to at least one model, and each group of A-type certified configuration parameters includes N4 terminal configuration parameters determined by machine verification parameters of a certified terminal. The eighth condition includes a parameter value similarity between N4 terminal configuration parameters in the N terminal configuration parameters of the target terminal and N4 parameters in the objective A-type certified configuration parameters being greater than or equal to a preset similarity threshold.

When the verifying unit 20 determines that the machine verification parameters of the target terminal satisfy the eighth condition, it is determined that the target terminal is a certified product, otherwise it is determined that the target terminal is a fake. When the verifying unit 20 determines that the machine verification parameters of the target terminal do not satisfy both the first condition and the seventh condition, it is determined whether the machine verification parameters of the target terminal satisfy the fourth condition, the fifth condition and the sixth.

The display unit 30 is configured to display the verification result of the target terminal on the user interface of the target terminal.

In some possible implementations, the second parameter group of the target terminal acquired by the machine verification parameter acquiring unit 10 includes a GPU manufacture parameter and a GPU renderer parameter. Before the verifying unit 20 determines whether the machine verification parameters of the target terminal satisfy the eighth condition in response to determining that the machine verification parameters of the target terminal satisfy the first condition and the seventh condition, the verifying unit 20 is further configured to determine whether the machine verification parameters of the target terminal satisfy a ninth condition and a tenth condition. The ninth condition includes abnormally reading a parameter value of a graphics processing unit (GPU) manufacturer parameter and a parameter value of a GPU renderer parameter of the target terminal. The tenth condition includes normally reading parameter values of respective terminal configuration parameters in the (N−2) terminal configuration parameters of the machine verification parameters of the target terminal excluding the GPU manufacturer parameter and the GPU renderer parameter.

When the verifying unit 20 determines that the machine verification parameters of the target terminal satisfy the ninth condition and the tenth condition, it is determined that the target terminal is incompletely configured. When the verifying unit 20 determines that the machine verification parameters of the target terminal do not satisfy both the ninth condition and the tenth condition, it is determined whether the machine verification parameters of the target terminal satisfy the first condition and the seventh condition.

The display unit 30 is configured to display on the user interface of the target terminal that the target terminal is incompletely configured.

In some possible implementations, the first parameter group of the target terminal includes a brand parameter. Before the verifying unit 20 determines that the target terminal is incompletely configured in response to determining that the machine verification parameters of the target terminal satisfy the ninth condition and the tenth condition, the verifying unit 20 is further configured to determine that the target terminal is a fake in response to determining that a brand parameter of the target terminal is in a preset fake machine brand parameter library. The preset fake machine brand parameter library includes at least one brand parameter of a terminal as the fake.

The display unit 30 is configured to display on the user interface of the target terminal that the target terminal is a fake.

In some possible implementations, the machine verification parameters of the target terminal acquired by the machine verification parameter acquiring unit 10 include a brand parameter, a model number parameter and a GPU renderer parameter. When the verifying unit 20 determines that the machine verification parameters of the target terminal do not satisfy the first condition, the second condition and the third condition, the verifying unit 20 is configured to determine that the target terminal is a fake when the brand parameter, the model number parameter and the GPU renderer parameter are consistent with a group of objective B-type fake machine configuration parameters in a preset second fake machine configuration parameter library. The second fake machine configuration parameter library includes one or more groups of B-type fake machine configuration parameters, and each group of B-type fake machine configuration parameters includes the brand parameter, the model number parameter and the GPU renderer parameter of the fake terminal.

The display unit 30 is configured to display on the user interface of the target terminal that the target terminal is a fake.

In some possible implementations, when the verifying unit 20 determines that the brand parameter, the model number parameter and the GPU renderer parameter are not consistent with any group of B-type fake machine configuration parameters in the preset second fake machine configuration parameter library, the verifying unit 20 is configured to determine that the target terminal is incompletely configured when any one or more of a parameter value of the brand parameter, a parameter value of the model number parameter, a parameter value of the device number parameter and a parameter value of the capacity parameter in the first parameter group of the target terminal are abnormally read.

The display unit 30 is configured to display on the user interface of the target terminal that the target terminal is incompletely configured.

In some possible implementations, when the verifying unit 20 determines that the parameter value of the brand parameter, the parameter value of the model number parameter, the parameter value of the device number parameter and the parameter value of the capacity parameter in the first parameter group of the target terminal are normally read, the verifying unit 20 is configured to determine the model of the target terminal according to the brand parameter, the model number parameter, the device number parameter and the capacity parameter, and obtain objective B-type certified configuration parameters from a preset second certified configuration parameter library according to the model of the target terminal. The second certified configuration parameter library includes at least one group of B-type certified configuration parameters corresponding to at least one model, and each group of B-type certified configuration parameters includes N4 terminal configuration parameters determined by machine verification parameters of a certified terminal. The verifying unit 20 is further configured to determine the verification result of the target terminal according to the N4 terminal configuration parameters in the N terminal configuration parameters of the target terminal and the objective B-type certified configuration parameters. The verification result of the target terminal includes a certified product, a fake and being unidentified.

The display unit 30 is configured to display the verification result of the target terminal on the user interface of the target terminal.

In some possible implementations, for the process of the machine verification parameter acquiring unit 10 reading the machine verification parameters of the target terminal, reference may be made to the process of reading the machine verification parameters of the target terminal described in block S101 in the first embodiment, and details are not described herein again. The machine verification parameters of the target terminal may include a brand parameter, a model number parameter, a device number parameter and a capacity parameter, a system platform parameter, a GPU manufacture parameter and a GPU renderer parameter, etc., which are not limited herein.

After the machine verification parameter acquiring unit 10 acquires the machine verification parameters of the target terminal, the verifying unit 20 can determine whether the machine verification parameters of the target terminal satisfy the fourth condition, the fifth condition and the sixth condition. The fourth condition includes the verifying unit 20 determining the model of the target terminal according to respective terminal configuration parameters in a third parameter group of the target terminal. The third parameter group includes N3 terminal configuration parameters in the N terminal configuration parameters. For example, the third parameter group may include a brand parameter, a model number parameter, a device number parameter, a capacity parameter, an operating platform parameter and a CPU hardware information parameter. The fifth condition includes the verifying unit 20 finding objective system modification parameters corresponding to the model from a preset system modification parameter library according to the model of the target terminal. The system modification parameter library includes at least one group of system modification parameters corresponding to at least one model, and each group of system modification parameters includes N3 terminal configuration parameters determined by machine verification parameters of a terminal whose system is modified. For example, the system modification parameters may include a mainboard parameter, a core number parameter, a CPU architecture parameter, a GPU manufacture parameter, a GPU renderer parameter, a first screen resolution parameter and a second screen resolution parameter of a terminal whose system is modified. The sixth condition includes the verifying unit 20 determining N3 terminal configuration parameters in the objective system modification parameters being consistent with N3 terminal configuration parameters in a fourth parameter group of the target terminal. The fourth parameter group includes N3 terminal configuration parameters in the N terminal configuration parameters.

In at least one embodiment, the first parameter group of the target terminal acquired by the machine verification parameter acquiring unit 10 may include a brand parameter, a device number parameter, a capacity parameter and a model number parameter. Before the verifying unit 20 determines whether the machine verification parameters of the target terminal satisfy the fourth condition, the fifth and the sixth condition, the verifying unit 20 can also determine the verification result of the target terminal according to the first condition, the seventh condition and the eighth condition. For the process of the verifying unit 20 determining the verification result of the target terminal according to the first condition, the seventh condition and the eighth condition, reference may be made to the process of determining the verification result of the target terminal according to the first condition, the seventh condition and the eighth condition described in block S102, and details are not described herein again. After the terminal device determines the verification result of the target terminal, the display unit 30 can display the verification result of the target terminal on the user interface of the target terminal. For details, reference may be made to the process of the terminal device displaying the verification result of the target terminal on its user interface described in block S103, and details are not described herein again.

In at least one embodiment, before the verifying unit 20 determines whether the machine verification parameters of the target terminal satisfy the first condition, the seventh condition and the eighth condition, the verifying unit 20 can also determine the verification result of the target terminal according to the ninth condition and the tenth condition. For the process of the verifying unit 20 determining the verification result of the target terminal according to the ninth condition and the tenth condition, reference may be made to the process of determining the verification result of the target terminal according to the ninth condition and the tenth condition described in block S102, and details are not described herein again. After the terminal device determines the verification result of the target terminal, the display unit 30 can display the verification result of the target terminal on the user interface of the target terminal. For details, reference may be made to the process of the terminal device displaying the verification result of the target terminal on its user interface described in block S103, and details are not described herein again.

In at least one embodiment, before the verifying unit 20 determines whether the machine verification parameters of the target terminal satisfy the ninth condition and the tenth condition, the verifying unit 20 may detect whether a brand parameter of the target terminal is in a preset fake machine brand parameter library. When the verifying unit 20 determines that the brand parameter is in the preset fake machine brand parameter library, it may be determined that the target terminal is a fake. For example, assuming that the verifying unit 20 detects that the machine verification parameters of the target terminal include a brand parameter 0PP0 (zero PP zero), and then the verifying unit 20 also detects the brand parameter 0PP0 in the preset fake machine brand parameter library, the verifying unit 20 may determine that the target terminal is a fake. When the verifying unit 20 determines that the brand parameter is not in the preset fake machine brand parameter library, the verifying unit 20 may determine whether the machine verification parameters of the target terminal satisfy the ninth condition and the tenth condition.

When the verifying unit 20 determines that the machine verification parameters of the target terminal satisfy the fourth condition, the fifth condition and the sixth condition, it may be determined that the system of the target terminal is modified. The display unit 30 may prompt on the user interface of the target terminal that the system of the target terminal is modified, and describe in detail which verification parameter is abnormally read. Moreover, the display unit 30 may also provide some options (such as re-verification or feedback) on the user interface of the target terminal for user selection. Please refer to FIG. 2 for specific effects. In this case, system modification is displayed on the verification result display area.

When the verifying unit 20 determines that the machine verification parameters of the target terminal do not satisfy the fourth condition, the fifth condition and the sixth condition, the verifying unit 20 can determine whether the machine verification parameters of the target terminal satisfy the first condition, the second condition and the third condition. The machine verification parameters include N terminal configuration parameters. The first condition includes the verifying unit 20 determining the model of the target terminal according to respective terminal configuration parameters in a first parameter group of the target terminal. The first parameter group includes N1 terminal configuration parameters in the N terminal configuration parameters. For example, the first parameter group may include a brand parameter, a model number parameter, a device number parameter and a capacity parameter in the machine verification parameters. The second condition includes the verifying unit 20 finding objective A-type fake machine configuration parameters corresponding to the model from a first fake machine configuration parameter library according to the model of the target terminal. The first fake machine configuration parameter library includes at least one group of A-type fake machine configuration parameters corresponding to at least one model, and each group of A-type fake machine configuration parameters includes N2 terminal configuration parameters determined by machine verification parameters of the fake terminal. For example, the A-type fake machine configuration parameters may include a capacity parameter, an operating platform parameter, a mainboard number parameter, a core number parameter, a CPU architecture parameter, a GPU manufacture parameter and a GPU renderer parameter. The third condition includes the verifying unit 20 determining N2 terminal configuration parameters in the objective A-type fake machine configuration parameters being consistent with N2 terminal configuration parameters in a second parameter group of the target terminal. The second parameter group of the target terminal includes N2 terminal configuration parameters in the N terminal configuration parameters, and parameter names of respective terminal configuration parameters in the second parameter group are consistent with parameter names of respective terminal configuration parameters in the A-type fake machine configuration parameters. When the verifying unit 20 determines that the machine verification parameters of the target terminal satisfy the first condition, the second condition and the third condition, it may be determined that the target terminal is a fake. After the verifying unit 20 determines the verification result of the target terminal, the display unit 30 can display the verification result of the target terminal on the user interface of the target terminal. For details, reference may be made to the process of displaying the verification result of the target terminal on the user interface of the target terminal described in block S103 in the first embodiment, and details are not described herein again.

In at least one embodiment, when the verifying unit 20 determines that the machine verification parameters of the target terminal do not satisfy the first condition, the second condition and the third condition, the verifying unit 20 may detect the brand parameter, the model number parameter and the GPU renderer parameter in the machine verification parameters of the target terminal. The verifying unit 20 can detect whether any group of B-type fake machine configuration parameters in the preset second fake machine configuration parameter library is matched with the brand parameter, the model number parameter and the GPU renderer parameter. The second fake machine configuration parameter library includes one or more groups of B-type fake machine configuration parameters, and each group of B-type fake machine configuration parameters includes the brand parameter, the model number parameter and the GPU renderer parameter of the fake terminal. When the verifying unit 20 detects that a group of objective B-type fake machine configuration parameters in the second fake machine configuration parameter library is matched with the brand parameter, the model number parameter and the GPU parameter, it is determined that target terminal is a fake. Then, the display unit 30 can display the verification result of the target terminal on the user interface of the target terminal. Moreover, the display unit 30 may also provide some options (such as re-verification or feedback) on the user interface of the target terminal.

In at least one embodiment, when the verifying unit 20 determines that any group of B-type fake machine configuration parameters in the second fake machine configuration parameter library is not matched with the brand parameter, the model number parameter and the GPU renderer parameter, the verifying unit 20 may detect whether the brand parameter, the model number parameter, the device number parameter and the capacity parameter in the first parameter group of the machine verification parameters of the target terminal are normally read. When the determination is no, it is determined that the target terminal is incompletely configured. Then, the display unit 30 can display the verification result of the target terminal on the user interface of the target terminal. Moreover, the display unit 30 may also provide some options (such as re-verification or feedback) on the user interface of the target terminal.

In at least one embodiment, when the verifying unit 20 determines that the brand parameter, the model number parameter, the device number parameter and the capacity parameter are normally read, the verifying unit 20 can determine the model of the target terminal according to the brand parameter, the model number parameter, the device number parameter and the capacity parameter, and obtain objective B-type certified configuration parameters from a second certified configuration parameter library according to the model of the target terminal. The second certified configuration parameter library includes at least one group of B-type certified configuration parameters corresponding to at least one model, and each group of B-type certified configuration parameters includes N4 terminal configuration parameters determined by machine verification parameters of a certified terminal. For the process of the verifying unit 20 obtaining B-type certified configuration parameters from the second certified configuration parameter library, reference may be made to the process of obtaining the objective A-type certified configuration parameters from the first certified configuration parameter library described in block S102 in the first embodiment, and details are not described herein again. Then, the verifying unit 20 can determine the verification result of the target terminal according to the machine verification parameters of the target terminal and the objective B-type certified configuration parameters. For the process of the verifying unit 20 determining the verification result of the target terminal according to the machine verification parameters of the target terminal and the objective B-type certified configuration parameters, reference may be made to the process of the terminal device determining the verification result of the target terminal according to the machine verification parameters of the target terminal and the objective A-type certified configuration parameters described in block S102 in the first embodiment, and details are not described herein again. In at least one embodiment, the verification result of the target terminal determined by the verifying unit 20 according to the machine verification parameters of the target terminal and the objective B-type certified configuration parameters may at least include three types of a certified product, a fake, or being unidentified.

In embodiments of the present disclosure, the terminal device reads the machine verification parameters of the target terminal. The machine verification parameters include N terminal configuration parameters. When the machine verification parameters of the target terminal satisfy the first condition, the second condition and the third condition, it is determined that the target terminal is a fake. The first condition includes determining the model of the target terminal according to respective terminal configuration parameters in the first parameter group of the target terminal. The first parameter group includes N1 terminal configuration parameters in the N terminal configuration parameters. The second condition includes finding objective A-type fake machine configuration parameters corresponding to the model from a first fake machine configuration parameter library according to the model of the target terminal. The first fake machine configuration parameter library includes at least one group of A-type fake machine configuration parameters corresponding to at least one model, and each group of A-type fake machine configuration parameters includes N2 terminal configuration parameters determined by machine verification parameters of a fake terminal. The third condition includes N2 terminal configuration parameters in the objective A-type fake machine configuration parameters being consistent with N2 terminal configuration parameters in a second parameter group of the target terminal. The second parameter group includes N2 terminal configuration parameters in the N terminal configuration parameters. It is displayed on the user interface of the target terminal that the target terminal is a fake. Moreover, in embodiments of the present disclosure, the process of determining whether the target terminal is incompletely configured is also added, and verification means for the target terminal are enriched. By applying embodiments of the present disclosure, probability of misdetection due to modification of internal chip information of the terminal can be reduced, and accuracy of terminal detection can be improved.

Figure 6:
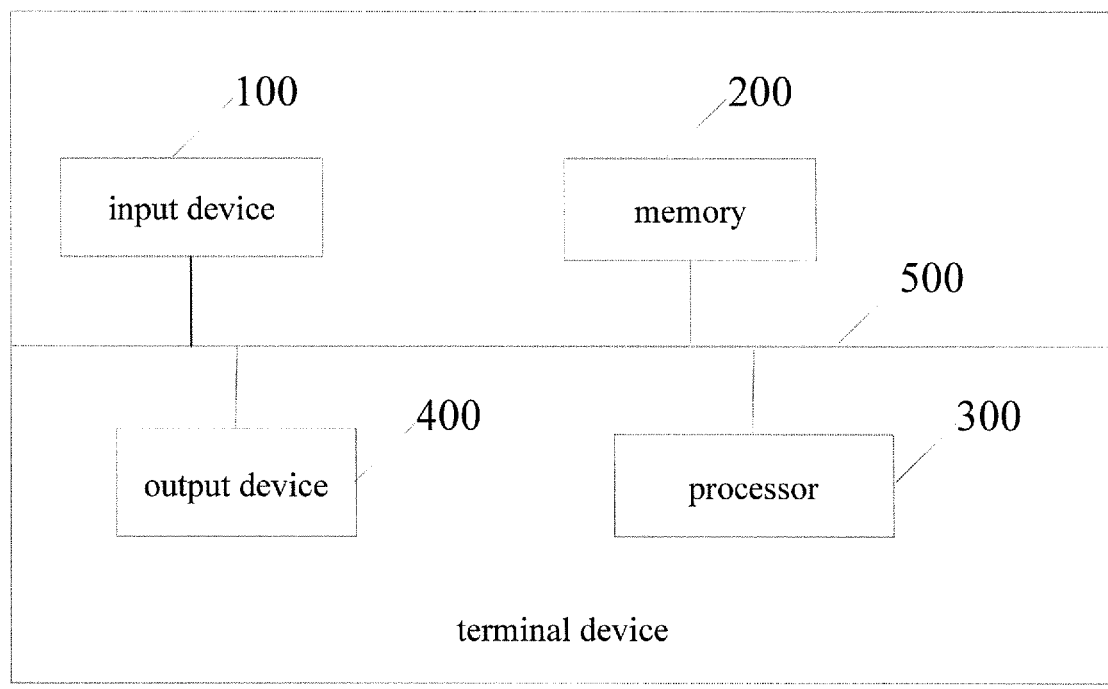
FIG. 6 is a block diagram of a terminal according to another embodiment of the present disclosure.

Referring to FIG. 6, which is a block diagram of a terminal device according to another embodiment of the present disclosure. As illustrated in FIG. 6, the terminal device in this embodiment may include one or more input devices 100, a memory 200, one or more processors 300 and one or more output devices 400. The processor 300, the input device 100, the output device 400 and the memory 200 are connected via a bus 500. The memory 200 is configured to store a computer program. The computer program includes program instructions. The processor 300 is configured to perform the program instructions stored in the memory 200. The processor 300 is configured to call the program instructions to perform: reading machine verification parameters of a target terminal, the machine verification parameters including N terminal configuration parameters; determining that the target terminal is a fake in response to determining that the machine verification parameters of the target terminal satisfy a first condition, a second condition and a third condition, in which the first condition includes determining a model of the target terminal according to respective terminal configuration parameters in a first parameter group of the target terminal, the first parameter group includes N1 terminal configuration parameters in the N terminal configuration parameters, the second condition includes finding objective A-type fake machine configuration parameters corresponding to the model from a first fake machine configuration parameter library according to the model of the target terminal, the first fake machine configuration parameter library includes at least one group of A-type fake machine configuration parameters corresponding to at least one model, each group of A-type fake machine configuration parameters includes N2 terminal configuration parameters determined by machine verification parameters of a fake terminal, the third condition includes N2 terminal configuration parameters in the objective A-type fake machine configuration parameters being consistent with N2 terminal configuration parameters in a second parameter group of the target terminal, the second parameter group includes N2 terminal configuration parameters in the N terminal configuration parameters; and displaying on a user interface of the target terminal that the target terminal is a fake.

It should be understood that, in embodiments of the present disclosure, the processor 300 may be a central processing unit (CPU), and may also be other general purpose processor, Digital Signal Processor (DSP), Application Specific Integrated Circuit (ASIC), Field-Programmable Gate Array (FPGA), or other programmable logic device, discrete gate, or transistor logic device, discrete hardware component, or the like. The general purpose processor may be a microprocessor, or the processor may be any conventional processor or the like.

The input device 100 may include a touchpad, a fingerprint acquisition sensor (configured to acquire user's fingerprint information and fingerprint orientation information), a microphone, etc. The output device 400 may include a display (LCD, etc.), a loudspeaker, etc.

The memory 200 may include a read-only memory and a random access memory, and provide instructions and data to the processor 300. A portion of the memory 200 may also include a non-volatile random access memory. For example, the memory 200 may store device type information.

In an implementation, the processor 300, the input device 100 and the output device 200 described in embodiments of the present disclosure can perform implementations described in the first embodiment and the second embodiment of the terminal verification method provided by embodiments of the present disclosure, and can also perform implementations of the terminal device described in embodiments of the present disclosure, which will not be described herein.

In another embodiment of the present disclosure, there is provided a computer readable storage medium. The computer readable storage medium is configured to store a computer program. The computer program includes program instructions. When the program instructions are executed by a processor, following acts are performed: reading machine verification parameters of a target terminal, the machine verification parameters including N terminal configuration parameters; determining that the target terminal is a fake in response to determining that the machine verification parameters of the target terminal satisfy a first condition, a second condition and a third condition, in which the first condition includes determining a model of the target terminal according to respective terminal configuration parameters in a first parameter group of the target terminal, the first parameter group includes N1 terminal configuration parameters in the N terminal configuration parameters, the second condition includes finding objective A-type fake machine configuration parameters corresponding to the model from a first fake machine configuration parameter library according to the model of the target terminal, the first fake machine configuration parameter library includes at least one group of A-type fake machine configuration parameters corresponding to at least one model, each group of A-type fake machine configuration parameters includes N2 terminal configuration parameters determined by machine verification parameters of a fake terminal, the third condition includes N2 terminal configuration parameters in the objective A-type fake machine configuration parameters being consistent with N2 terminal configuration parameters in a second parameter group of the target terminal, the second parameter group includes N2 terminal configuration parameters in the N terminal configuration parameters; and displaying on a user interface of the target terminal that the target terminal is a fake.

The above-mentioned computer readable storage medium may be an internal storage unit of the terminal device described in any one of the above embodiments, such as a hard disk or a memory of the terminal device. The above-mentioned computer readable storage medium may also be an external storage device of the terminal device, such as a plug-in hard disk, a smart media card (SMC), a secure digital (SD) card or a Flash Cards equipped on the terminal device. Furthermore, the above-mentioned computer readable storage medium may also include both the internal storage unit and the external storage device of the terminal device. The above-mentioned computer readable storage medium is configured to store the above computer program and other programs and data required by the terminal device. The above-mentioned computer readable storage medium may also be configured to temporarily store data that has been outputted or to be outputted.

Those skilled in the art may be aware that, the exemplary units and algorithm steps described in embodiments of the present disclosure can be implemented by electronic hardware, computer software, or a combination of both. In order to clearly illustrate the interchangeability of hardware and software, the components and steps of each example have been generally described in terms of functions in the above specification. Whether these functions are performed in hardware or software depends on the specific application of the technical solutions and design constraint conditions. Those skilled in the art may use different methods to implement the described functions for each specific application, but the implementation should not be considered beyond the scope of the present disclosure.

Those skilled in the art can clearly understand that, for convenience and conciseness of description, the specific operating process of the terminal device and the unit described above may refer to the corresponding process in the foregoing method embodiment, and details are not described herein again.

In several embodiments provided by the present disclosure, it should be understood that, the system, devices and method disclosed in several embodiments provided by the present disclosure can be realized in any other manner. For example, the device embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit.

If the functions are realized in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

The foregoing descriptions are merely specific implementation manners of the present disclosure, but the protection scope of the present disclosure is not limited thereto. Various equivalent modifications or replacements that can easily be conceived by those skilled in the art within the technical scope of the present disclosure should be within the protection s scope of the present disclosure. Therefore, the protection scope of the present disclosure shall be subject to the protection scope of the claims.

What is claimed is:

1. A terminal verification method, comprising:
reading machine verification parameters of a target terminal, the machine verification parameters comprising N terminal configuration parameters;
determining that the target terminal is a fake in response to determining that the machine verification parameters of the target terminal satisfy a first condition, a second condition and a third condition, wherein the first condition comprises determining a model of the target terminal according to respective terminal configuration parameters in a first parameter group of the target terminal, the first parameter group comprises N1 terminal configuration parameters in the N terminal configuration parameters, the second condition comprises finding objective A-type fake machine configuration parameters corresponding to the model from a first fake machine configuration parameter library according to the model of the target terminal, the first fake machine configuration parameter library comprises at least one group of A-type fake machine configuration parameters corresponding to at least one model, each group of A-type fake machine configuration parameters comprises N2 terminal configuration parameters determined by machine verification parameters of a fake terminal, the third condition comprises N2 terminal configuration parameters in the objective A-type fake machine configuration parameters being consistent with N2 terminal configuration parameters in a second parameter group of the target terminal, the second parameter group comprises N2 terminal configuration parameters in the N terminal configuration parameters; and displaying on a user interface of the target terminal that the target terminal is a fake.

2. The method according to claim 1, wherein before determining that the target terminal is a fake in response to determining that the machine verification parameters of the target terminal satisfy the first condition, the second condition and the third condition, the method further comprises:

determining that a system of the target terminal is modified in response to determining that the machine verification parameters of the target terminal satisfy a fourth condition, a fifth condition and a sixth condition, wherein the fourth condition comprises determining the model of the target terminal according to respective terminal configuration parameters in a third parameter group of the target terminal, the third parameter group comprises N3 terminal configuration parameters in the N terminal configuration parameters, the fifth condition comprises finding objective system modification parameters corresponding to the model from a preset system modification parameter library according to the model of the target terminal, the system modification parameter library comprises at least one group of system modification parameters corresponding to at least one model, each group of system modification parameters comprises N3 terminal configuration parameters determined by machine verification parameters of a terminal whose system is modified, the sixth condition comprises N3 terminal configuration parameters in the objective system modification parameters being consistent with N3 terminal configuration parameters in a fourth parameter group of the target terminal, the fourth parameter group comprises N3 terminal configuration parameters in the N terminal configuration parameters;

displaying on a user interface of the target terminal that, the system of the target terminal is modified; and determining whether the machine verification parameters of the target terminal satisfy the first condition, the second condition and the third condition in response to determining that the machine verification parameters of the target terminal do not satisfy the fourth condition, the fifth condition and the sixth condition.

3. The method according to claim 2, wherein before determining that the system of the target terminal is modified in response to determining that the machine verification parameters of the target terminal satisfy the fourth condition, the fifth condition and the sixth condition, the method further comprises:

determining whether the machine verification parameters of the target terminal satisfy an eighth condition in response to determining that the machine verification parameters of the target terminal satisfy the first condition and a seventh condition, wherein the seventh condition comprises finding objective A-type certified configuration parameters corresponding to the model from a preset first certified configuration parameter library according to the model of the target terminal, the first certified configuration parameter library comprises at least one group of A-type certified configuration parameters corresponding to at least one model, each group of A-type certified configuration parameters comprises N4 terminal configuration parameters determined by machine verification parameters of a certified terminal, the eighth condition comprises a parameter value similarity between N4 terminal configuration parameters in the N terminal configuration parameters of the target terminal and N4 parameters in the objective A-type certified configuration parameters being greater than or equal to a preset similarity threshold;

determining that the target terminal is a certified product in response to determining that the machine verification parameters of the target terminal satisfy the eighth condition, and determining that the target terminal is a fake in response to determining that the machine verification parameters of the target terminal do not satisfy the eighth condition; and determining whether the machine verification parameters of the target terminal satisfy the fourth condition, the fifth condition and the sixth condition in response to determining that the machine verification parameters of the target terminal do not satisfy both the first condition and the seventh condition.

4. The method according to claim 3, wherein before determining whether the machine verification parameters of the target terminal satisfy the eighth condition in response to determining that the machine verification parameters of the target terminal satisfy the first condition and the seventh condition, the method further comprises:

determining whether the machine verification parameters of the target terminal satisfy a ninth condition and a tenth condition, wherein the ninth condition comprises abnormally reading a parameter value of a graphics processing unit (GPU) manufacturer parameter and a parameter value of a GPU renderer parameter of the target terminal, the tenth condition comprises normally reading parameter values of respective terminal configuration parameters in the (N−2) terminal configuration parameters of the machine verification parameters of the target terminal excluding the GPU manufacturer parameter and the GPU renderer parameter;

determining that the target terminal is incompletely configured in response to determining that the machine verification parameters of the target terminal satisfy the ninth condition and the tenth condition, and displaying that the target terminal is incompletely configured; and determining whether the machine verification parameters of the target terminal satisfy the first condition and the seventh condition in response to determining that the machine verification parameters of the target terminal do not satisfy both the ninth condition and the tenth condition.

5. The method according to claim 1, wherein the machine verification parameters of the target terminal comprise a brand parameter, a model number parameter and a GPU renderer parameter, the method further comprises:

in response to determining that the machine verification parameters of the target terminal do not satisfy the first condition, the second condition and the third condition, determining that the target terminal is a fake when the brand parameter, the model number parameter and the GPU renderer parameter are consistent with a group of objective B-type fake machine configuration parameters in a preset second fake machine configuration parameter library, wherein the second fake machine configuration parameter library comprises one or more groups of B-type fake machine configuration parameters, and each group of B-type fake machine configuration parameters comprises the brand parameter, the model number parameter and the GPU renderer parameter of the fake terminal.

6. The method according to claim 5, further comprising:

when the brand parameter, the model number parameter and the GPU renderer parameter are not consistent with any group of B-type fake machine configuration parameters in the preset second fake machine configuration parameter library, determining that the target terminal is incompletely configured when any one or more of a parameter value of the brand parameter, a parameter value of the model number parameter, a parameter value of the device number parameter and a parameter value of the capacity parameter in the first parameter group of the target terminal are abnormally read; and displaying that the target terminal is incompletely configured.

7. The method according to claim 6, further comprising:

when the parameter value of the brand parameter, the parameter value of the model number parameter, the parameter value of the device number parameter and the parameter value of the capacity parameter in the first parameter group of the target terminal are normally read, determining the model of the target terminal according to the brand parameter, the model number parameter, the device number parameter and the capacity parameter, and obtaining objective B-type certified configuration parameters from a preset second certified configuration parameter library according to the model of the target terminal, wherein the second certified configuration parameter library comprises at least one group of B-type certified configuration parameters corresponding to at least one model, and each group of B-type certified configuration parameters comprises N4 terminal configuration parameters determined by machine verification parameters of a certified terminal; and determining a verification result of the target terminal according to the N4 terminal configuration parameters in the N terminal configuration parameters of the target terminal and the objective B-type certified configuration parameters, wherein the verification result of the target terminal comprises a certified product, a fake and being unidentified.

8. A terminal device, comprising:

a processor; and a memory, configured to store a computer program comprising program instructions;

wherein the processor is configured to:

read machine verification parameters of a target terminal, the machine verification parameters comprising N terminal configuration parameters;

determine that the target terminal is a fake in response to determining that the machine verification parameters of the target terminal satisfy a first condition, a second condition and a third condition, wherein the first condition comprises determining a model of the target terminal according to respective terminal configuration parameters in a first parameter group of the target terminal, the first parameter group comprises N1 terminal configuration parameters in the N terminal configuration parameters, the second condition comprises finding objective A-type fake machine configuration parameters corresponding to the model from a first fake machine configuration parameter library according to the model of the target terminal, the first fake machine configuration parameter library comprises at least one group of A-type fake machine configuration parameters corresponding to at least one model, each group of A-type fake machine configuration parameters comprises N2 terminal configuration parameters determined by machine verification parameters of a fake terminal, the third condition comprises N2 terminal configuration parameters in the objective A-type fake machine configuration parameters being consistent with N2 terminal configuration parameters in a second parameter group of the target terminal, the second parameter group comprises N2 terminal configuration parameters in the N terminal configuration parameters; and display on a user interface of the target terminal that, the target terminal is a fake.

9. The terminal device according to claim 8, wherein before determining that the target terminal is a fake in response to determining that the machine verification parameters of the target terminal satisfy the first condition, the second condition and the third condition, the processor is configured to:

determine that a system of the target terminal is modified in response to determining that the machine verification parameters of the target terminal satisfy a fourth condition, a fifth condition and a sixth condition, wherein the fourth condition comprises determining the model of the target terminal according to respective terminal configuration parameters in a third parameter group of the target terminal, the third parameter group comprises N3 terminal configuration parameters in the N terminal configuration parameters, the fifth condition comprises finding objective system modification parameters corresponding to the model from a preset system modification parameter library according to the model of the target terminal, the system modification parameter library comprises at least one group of system modification parameters corresponding to at least one model, each group of system modification parameters comprises N3 terminal configuration parameters determined by machine verification parameters of a terminal whose system is modified, the sixth condition comprises N3 terminal configuration parameters in the objective system modification parameters being consistent with N3 terminal configuration parameters in a fourth parameter group of the target terminal, the fourth parameter group comprises N3 terminal configuration parameters in the N terminal configuration parameters;

determine whether the machine verification parameters of the target terminal satisfy the first condition, the second condition and the third condition in response to determining that the machine verification parameters of the target terminal do not satisfy the fourth condition, the fifth condition and the sixth condition; and display on a user interface of the target terminal that, the system of the target terminal is modified.

10. The terminal device according to claim 9, wherein before determining that the system of the target terminal is modified in response to determining that the machine verification parameters of the target terminal satisfy the fourth condition, the fifth condition and the sixth condition, the processor is configured to:

determine whether the machine verification parameters of the target terminal satisfy an eighth condition in response to determining that the machine verification parameters of the target terminal satisfy the first condition and a seventh condition, wherein the seventh condition comprises finding objective A-type certified configuration parameters corresponding to the model from a preset first certified configuration parameter library according to the model of the target terminal, the first certified configuration parameter library comprises at least one group of A-type certified configuration parameters corresponding to at least one model, each group of A-type certified configuration parameters comprises N4 terminal configuration parameters determined by machine verification parameters of a certified terminal, the eighth condition comprises a parameter value similarity between N4 terminal configuration parameters in the N terminal configuration parameters of the target terminal and N4 parameters in the objective A-type certified configuration parameters being greater than or equal to a preset similarity threshold;

determine that the target terminal is a certified product in response to determining that the machine verification parameters of the target terminal satisfy the eighth condition, and determine that the target terminal is a fake in response to determining that the machine verification parameters of the target terminal do not satisfy the eighth condition; and determine whether the machine verification parameters of the target terminal satisfy the fourth condition, the fifth condition and the sixth condition in response to determining that the machine verification parameters of the target terminal do not satisfy both the first condition and the seventh condition.

11. The terminal device according to claim 10, wherein before determining whether the machine verification parameters of the target terminal satisfy the eighth condition in response to determining that the machine verification parameters of the target terminal satisfy the first condition and the seventh condition, the processor is configured to:

determine whether the machine verification parameters of the target terminal satisfy a ninth condition and a tenth condition, wherein the ninth condition comprises abnormally reading a parameter value of a graphics processing unit (GPU) manufacturer parameter and a parameter value of a GPU renderer parameter of the target terminal, the tenth condition comprises normally reading parameter values of respective terminal configuration parameters in the (N−2) terminal configuration parameters of the machine verification parameters of the target terminal excluding the GPU manufacturer parameter and the GPU renderer parameter;

determine that the target terminal is incompletely configured in response to determining that the machine verification parameters of the target terminal satisfy the ninth condition and the tenth condition;

determine whether the machine verification parameters of the target terminal satisfy the first condition and the seventh condition in response to determining that the machine verification parameters of the target terminal do not satisfy both the ninth condition and the tenth condition; and display on the user interface of the target terminal that the target terminal is incompletely configured.

12. The terminal device according to claim 8, wherein the machine verification parameters of the target terminal comprises a brand parameter, a model number parameter and a GPU renderer parameter, the processor is configured to:

in response to determining that the machine verification parameters of the target terminal do not satisfy the first condition, the second condition and the third condition, determine that the target terminal is a fake when the brand parameter, the model number parameter and the GPU renderer parameter are consistent with a group of objective B-type fake machine configuration parameters in a preset second fake machine configuration parameter library, wherein the second fake machine configuration parameter library comprises one or more groups of B-type fake machine configuration parameters, and each group of B-type fake machine configuration parameters comprises the brand parameter, the model number parameter and the GPU renderer parameter of the fake terminal.

13. The terminal device according to claim 12, wherein the processor is configured to:

when the brand parameter, the model number parameter and the GPU renderer parameter are not consistent with any group of B-type fake machine configuration parameters in the preset second fake machine configuration parameter library, determine that the target terminal is incompletely configured when any one or more of a parameter value of the brand parameter, a parameter value of the model number parameter, a parameter value of the device number parameter and a parameter value of the capacity parameter in the first parameter group of the target terminal are abnormally read; and display on the user interface of the target terminal that, target terminal is incompletely configured.

14. The terminal device according to claim 13, wherein the processor is configured to:

when the parameter value of the brand parameter, the parameter value of the model number parameter, the parameter value of the device number parameter and the parameter value of the capacity parameter in the first parameter group of the target terminal are normally read, determine the model of the target terminal according to the brand parameter, the model number parameter, the device number parameter and the capacity parameter, and obtain objective B-type certified configuration parameters from a preset second certified configuration parameter library according to the model of the target terminal, wherein the second certified configuration parameter library comprises at least one group of B-type certified configuration parameters corresponding to at least one model, and each group of B-type certified configuration parameters comprises N4 terminal configuration parameters determined by machine verification parameters of a certified terminal; and determine a verification result of the target terminal according to the N4 terminal configuration parameters in the N terminal configuration parameters of the target terminal and the objective B-type certified configuration parameters, wherein the verification result of the target terminal comprises a certified product, a fake and being unidentified.

15. A computer readable storage medium, configured to store a computer program comprising program instructions that, when executed by a processor, cause the processor to perform a terminal verification method, the method comprising:

reading machine verification parameters of a target terminal, the machine verification parameters comprising N terminal configuration parameters;

determining that the target terminal is a fake in response to determining that the machine verification parameters of the target terminal satisfy a first condition, a second condition and a third condition, wherein the first condition comprises determining a model of the target terminal according to respective terminal configuration parameters in a first parameter group of the target terminal, the first parameter group comprises N1 terminal configuration parameters in the N terminal configuration parameters, the second condition comprises finding objective A-type fake machine configuration parameters corresponding to the model from a first fake machine configuration parameter library according to the model of the target terminal, the first fake machine configuration parameter library comprises at least one group of A-type fake machine configuration parameters corresponding to at least one model, each group of A-type fake machine configuration parameters comprises N2 terminal configuration parameters determined by machine verification parameters of a fake terminal, the third condition comprises N2 terminal configuration parameters in the objective A-type fake machine configuration parameters being consistent with N2 terminal configuration parameters in a second parameter group of the target terminal, the second parameter group comprises N2 terminal configuration parameters in the N terminal configuration parameters; and displaying on a user interface of the target terminal that the target terminal is a fake.

\* \* \* \* \*